United States Patent [19]

Lottes et al.

[11] Patent Number: 4,567,323

[45] Date of Patent: Jan. 28, 1986

[54] METHOD AND APPARATUS FOR PROVIDING A PLURALITY OF SPECIAL SERVICES

[75] Inventors: Rosanna M. Lottes; Grant E. Swinehart, both of Naperville, Ill.

[73] Assignee: AT&T Bell Laboratories, Murray Hill, N.J.

[21] Appl. No.: 513,079

[22] Filed: Jul. 12, 1983

[51] Int. Cl.⁴ .............................................. H04M 3/42
[52] U.S. Cl. .................................. 179/18 B; 179/84 C
[58] Field of Search ........... 179/18 B, 18 BA, 18 BG, 179/84 C, 18 FH

[56] References Cited

U.S. PATENT DOCUMENTS

| Re. 27,422 | 7/1982 | Schoeffler | 179/18 BA |
| 4,054,756 | 10/1977 | Comella et al. | 179/18 B |
| 4,139,739 | 2/1979 | von Meister et al. | 179/18 B |
| 4,166,929 | 10/1979 | Sheinbein | 179/18 BG |
| 4,277,649 | 7/1981 | Sheinbein | 179/18 B |
| 4,278,844 | 7/1981 | Jones | 179/18 B |

FOREIGN PATENT DOCUMENTS 2010641 6/1979 United Kingdom .

Primary Examiner—Thomas W. Brown
Attorney, Agent, or Firm—Richard J. Godlewski

[57] ABSTRACT

For use with a telephone system serving a plurality of stations, method and apparatus is disclosed for providing a plurality of special services by designating a memory dedicated to a particular station for a selected one of the services on a per call basis. Responsive to a call between a particular one and a specific calling/called one of the stations, a memory dedicated to the particular station is designated for a selected calling/called station special service. The directory number of the specific calling/called station is also stored in the designated memory for subsequently activating the selected service. Responsive to a predetermined activation code entered at the paticular station, the selected special sevice is activated using the stored directory number of the specific calling/called station. When the specific station is in a busy condition, completion of the selected special service is delayed until both the particular and the specific stations are in an idle condition.

52 Claims, 18 Drawing Figures

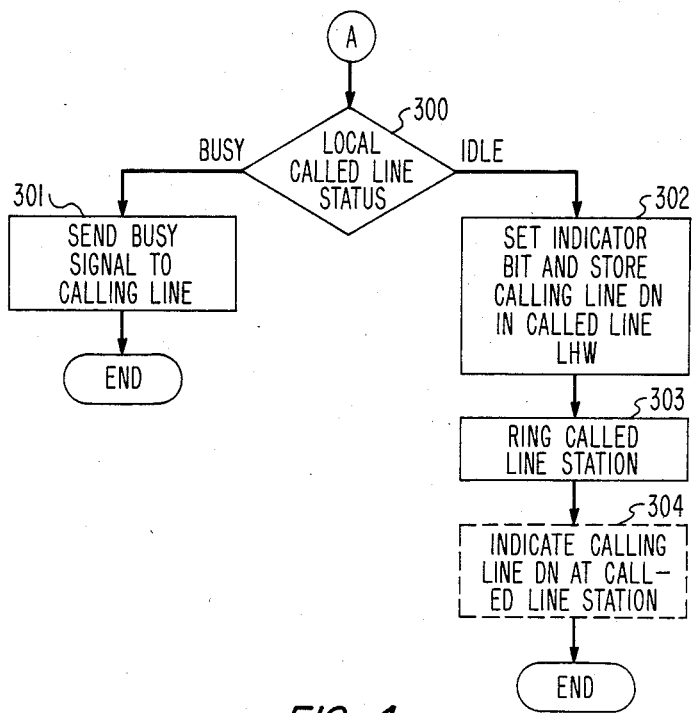
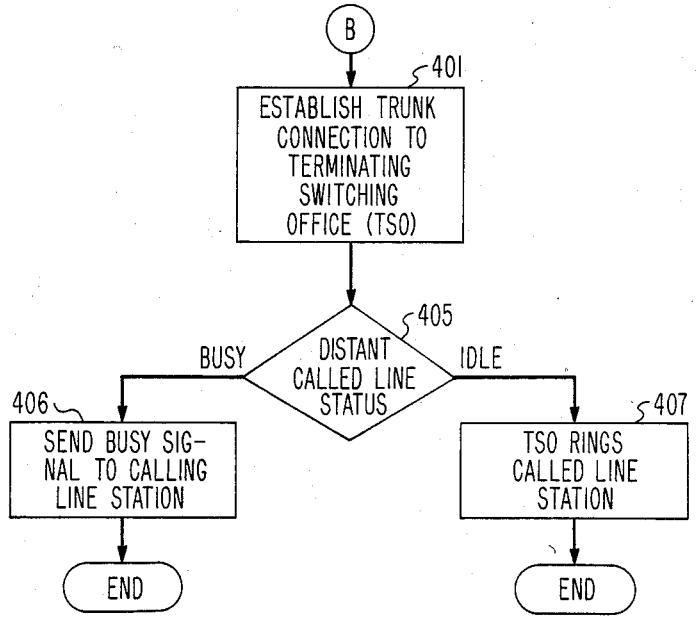

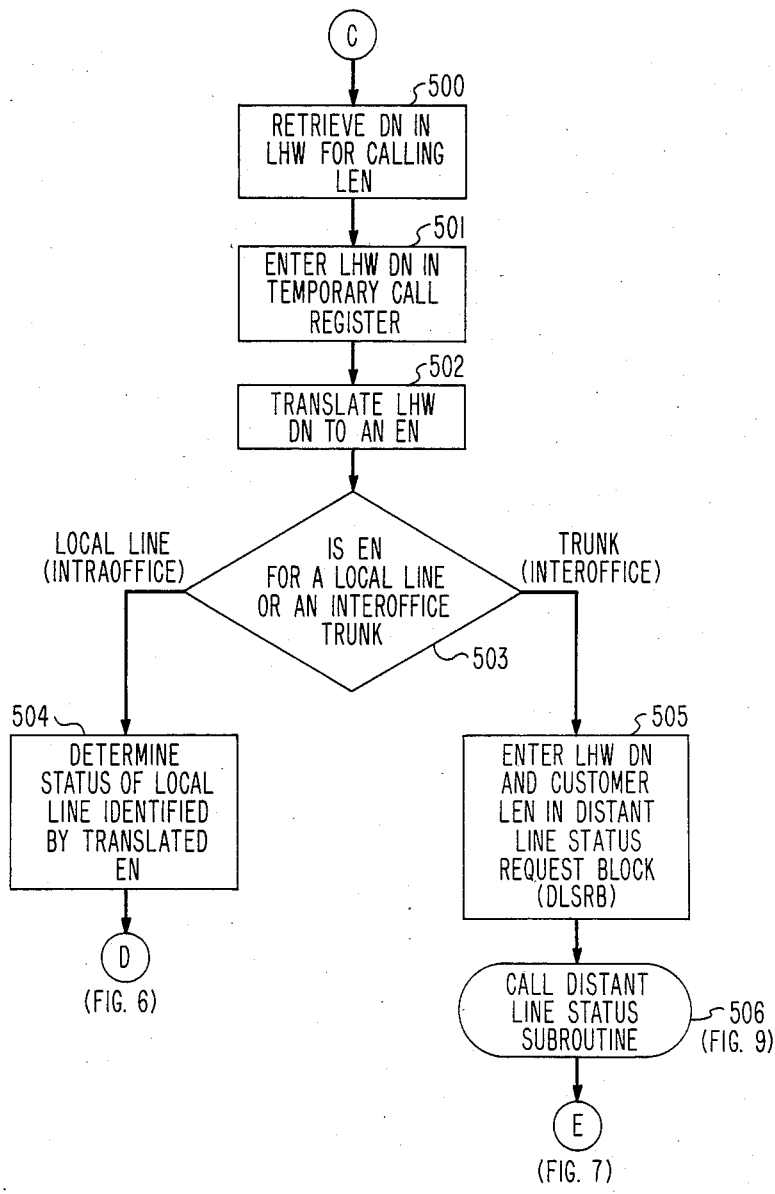

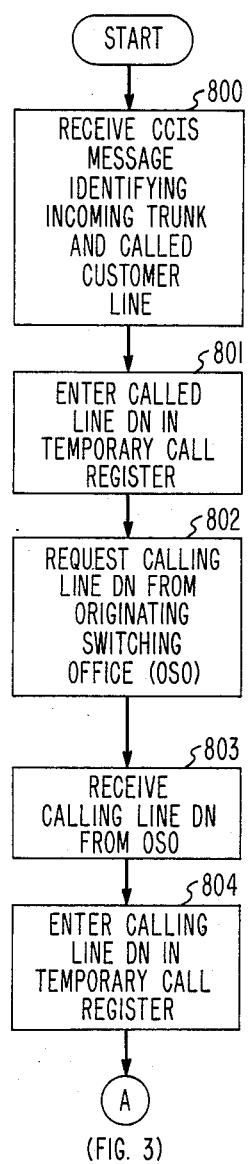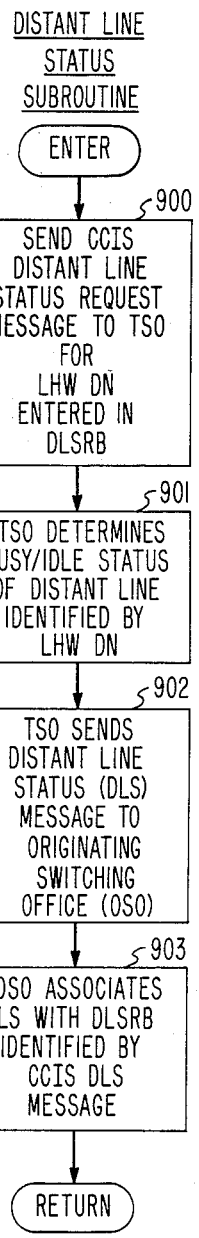

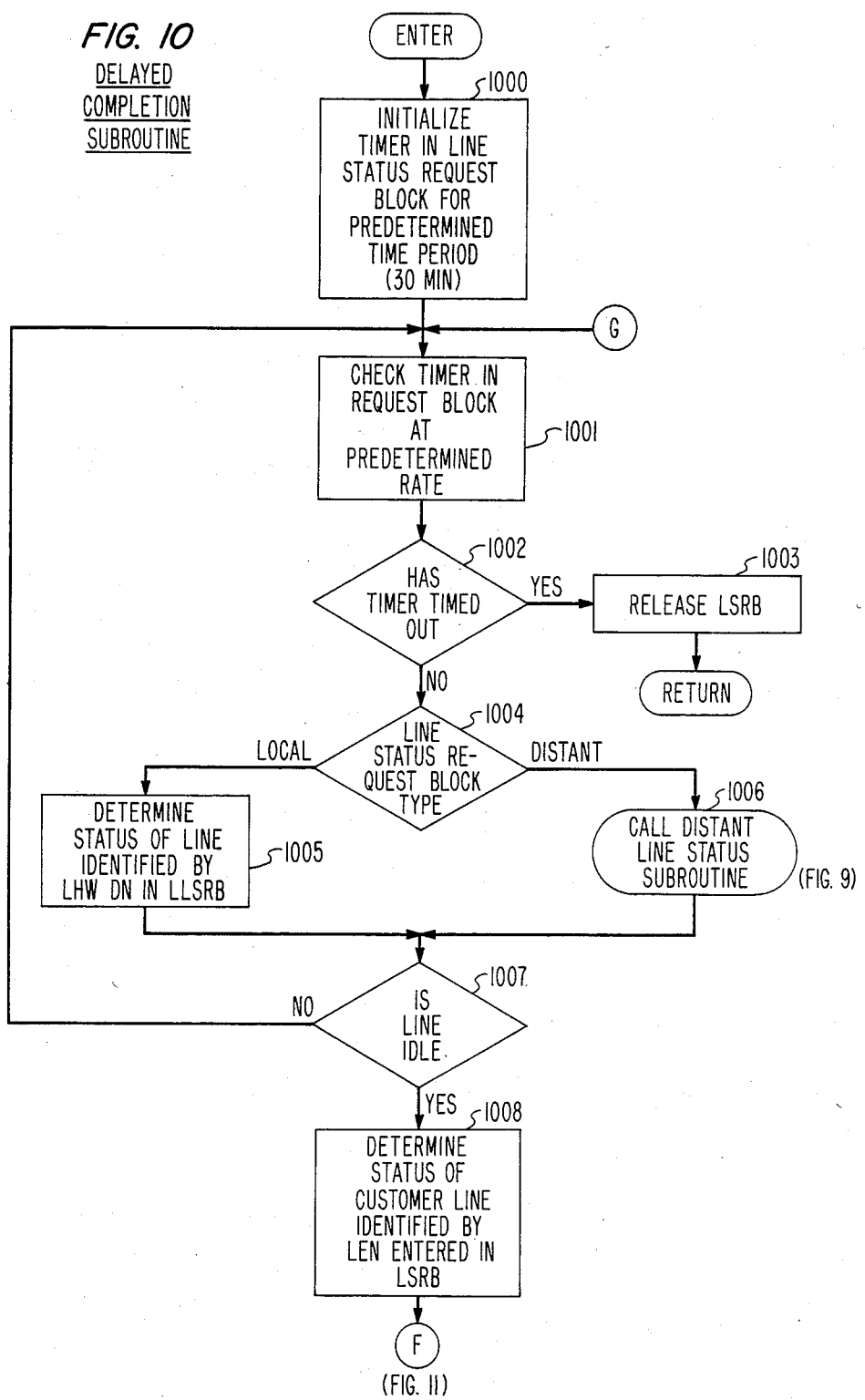

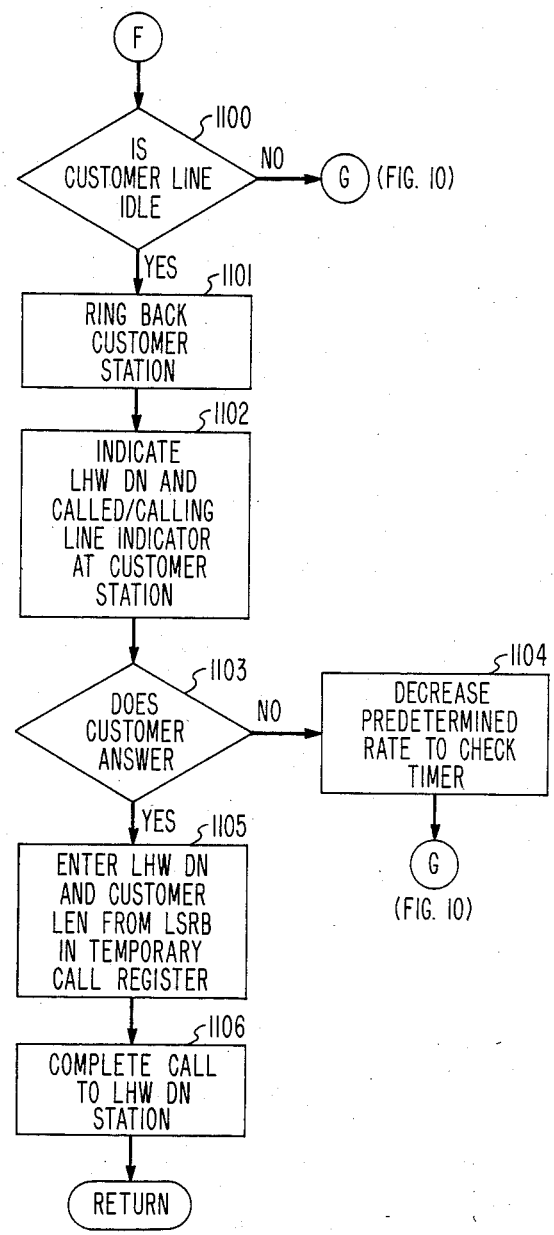

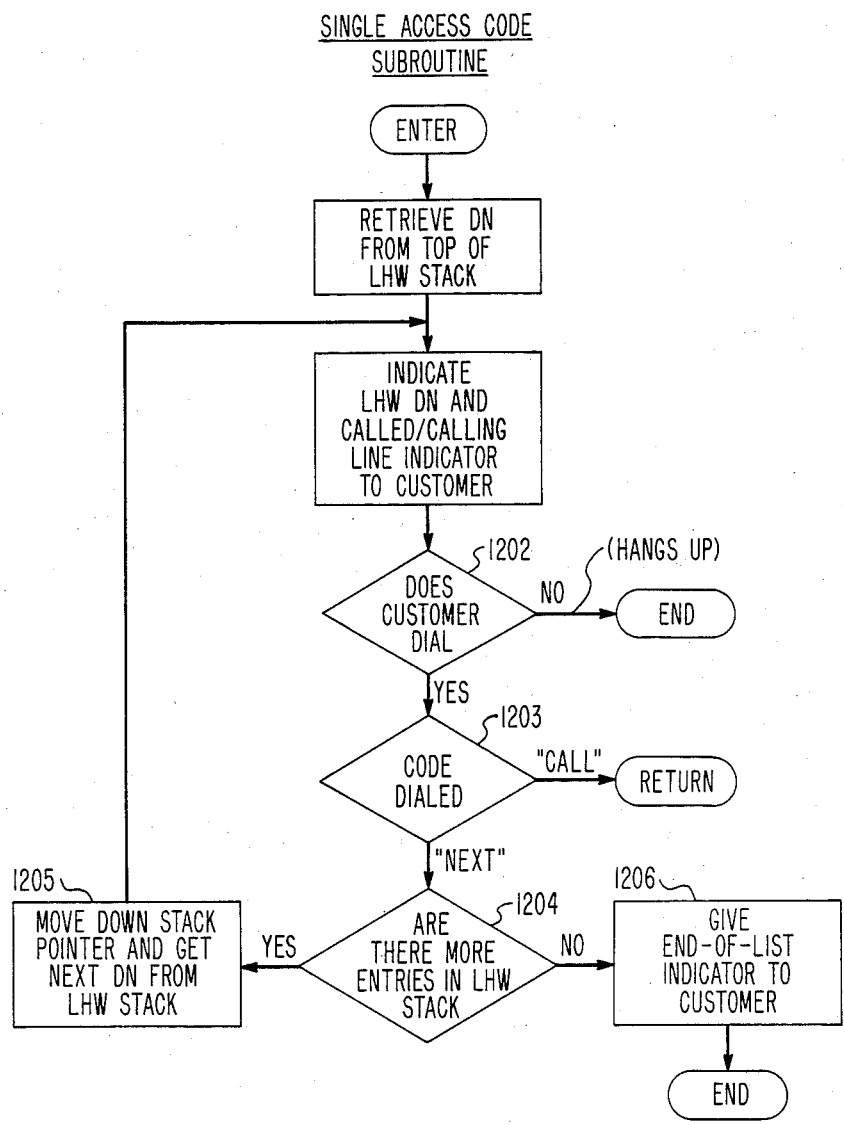

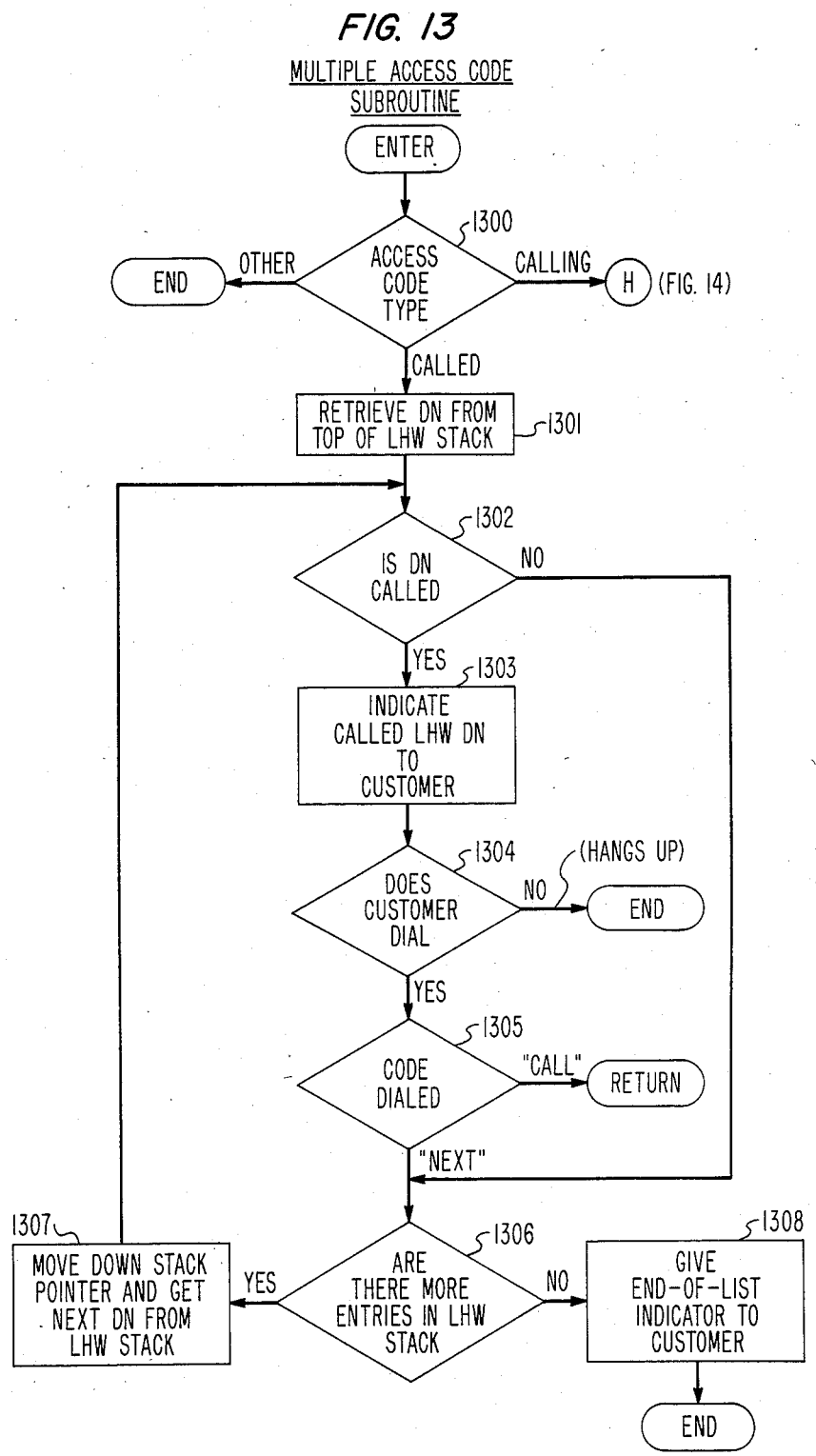

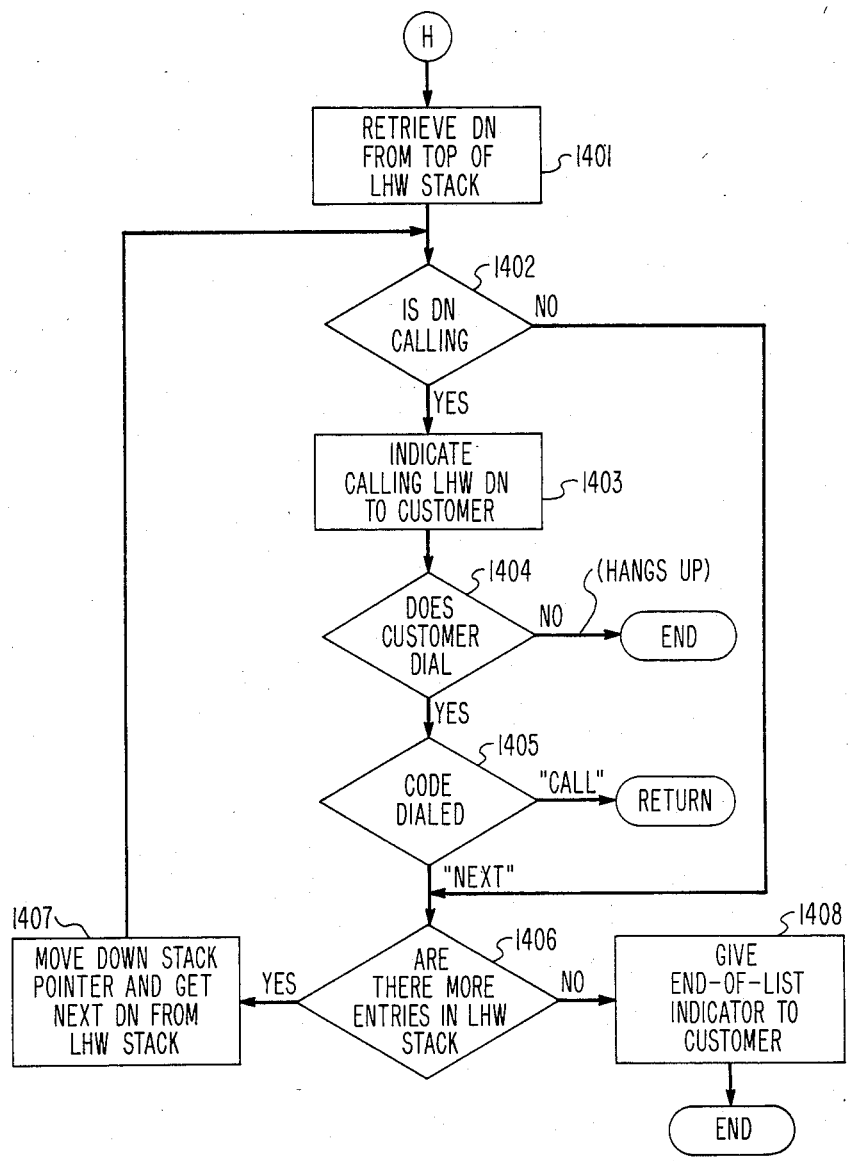

TEMPORARY CALL REGISTER
LAYOUT

INDIVIDUAL LSRB
LAYOUT

FIG. 17
LINE HISTORY WORD DATA STRUCTURE
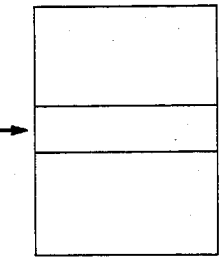
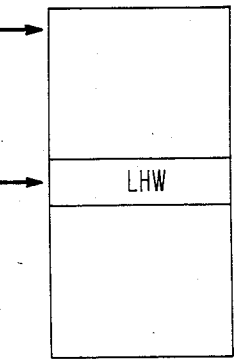
LHW HEAD TABLE
LHW TABLE
LHW
SELECTOR | INDEX
LEN
FIG. 18
LINE HISTORY WORD LAYOUT
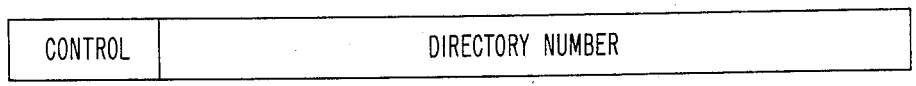
| CONTROL | DIRECTORY NUMBER |

METHOD AND APPARATUS FOR PROVIDING A PLURALITY OF SPECIAL SERVICES

CROSS-REFERENCE TO RELATED APPLICATIONS

This application is related to the applications of R. W. Foster et al., entitled "Method and Apparatus for Providing Call Tracing Service", Ser. No. 512,956, and C. A. Doughty, entitled "Method and Apparatus for Sending a Data Message to a Selected Station during a Silent Interval between Ringing", Ser. No. 512,955 and "Method and Apparatus for Displaying at a Selected Station Special Service Information during a Silent Interval between Ringing", Ser. No. 513,080, all filed concurrently on July 12, 1983, with this application.

TECHNICAL FIELD

This invention relates to communication systems and particularly to the provision of special services in a telephone system.

BACKGROUND OF THE INVENTION

In the past, certain special services have been made available to telephone customers to provide them with features which render their telephone usage more convenient and more flexible. For example, these services may include automatic recall, automatic callback, and message waiting.

Automatic recall is a service for automatically establishing a connection to a previously called station in response to an abbreviated dialed code. One arrangement for providing such a service is disclosed in U.S. Pat. No. 3,493,688 (Re. No. 27,422) of M. S. Schoeffler, issued Feb. 3, 1970 and reissued July 4, 1972. The patent discloses that the called directory number is automatically written into a location of a central memory designated for the service to the exclusion of any previously written directory number. By dialing an abbreviated code, the customer can retrieve the last called directory number from the designated location. The retrieved directory number is then automatically used to establish a connection to the station defined thereby.

Automatic callback service, also referred to as automatic call retry, eliminates the effort required to reach persistently busy stations. The art has progressed to the point where commercially available equipment checks the called station to determine that it is idle before any reattempt is made to complete a connection. One such interoffice callback arrangement is disclosed in U.S. Pat. No. 4,166,929 of D. Sheinbein, issued Sept. 4, 1979. This arrangement discloses facilities for processing interoffice callback information between program-controlled call processors in call originating and terminating telephone offices. Each processor includes a register for storing the calling and called station identities in response to a dialed callback code from the calling station during the initial stages of a call. The arrangement then uses this and other stored information to complete a call between the two stations when the called station becomes idle.

Another special service, called "message waiting", indicates at a called station that a calling station has left a message. When a call is not answered by the called station, a message along with the directory number of the calling party is written into a memory location dedicated for the service in response to a predetermined code entered at the calling station. In addition, a lamp is commonly lighted at the idle called station to indicate the presence of the stored message.

The problem in providing a plurality of these types of services is that each service is offered as a separate stand-alone service. In particular, each service has separate dedicated memory to store information for providing the particular service. This information commonly includes the identity of the involved stations such as the calling and called directory numbers. As a consequence, the same pair of calling and called directory numbers may be stored in these memories as many times as there are services. Furthermore, when stored in a memory dedicated to a particular service, the called and calling directory numbers are usually not accessible for any other service.

SUMMARY OF THE INVENTION

The foregoing problems are solved and a technical advance is achieved by method and apparatus for providing a plurality of special services by designating a memory dedicated to a station, herein referred to as the "particular" station, for at least a selected one of the services on a per call basis. In response to a call between the particular station and another one of the stations, a memory associated with the particular station is designated for at least a selected one of the special services. Information related to the other station for providing the selected special service is stored in the designated memory.

In one illustrative embodiment of the invention, responsive to a call from a calling station incoming to the particular station having the feature, a memory dedicated to the particular station is designated for a selected calling station service. The directory number of the calling station is then stored in the designated memory for subsequently providing the selected calling station service. Likewise, responsive to a call originating from the particular station to a called station, the dedicated memory is designated for a selected called station service. The directory number of the called station is then stored in the designated memory for subsequently providing the selected called station service.

In accordance with another feature of the invention, information related to the other station such as the directory number is indicated at the particular station.

In accordance with still another feature of the invention, responsive to a predetermined code entered at the particular station, the selected special service is activated using the inrormation related to the other station which was stored in the designated memory.

In accordance with yet another feature of the invention, completion of the selected service is delayed in response to the busy/idle condition of the other station.

In accordance with still yet another feature of the invention, the completion of the selected service is delayed until either the particular station responds to distinctive signaling or a predetermined period of time has elapsed.

BRIEF DESCRIPTION OF THE DRAWING

The invention may be better understood from the following detailed description when read with reference to the drawing in which:

FIGS. 2-14 disclose flow diagrams of the sequence of operations of the telephone switching systems shown in FIG. 1 for providing a plurality of special services;

FIG. 17 discloses the line history word data structure of the call store memory in FIG. 1 for accessing an entry in the line history word table; and FIG. 18 is the memory layout of a line history word table entry in the call store memory of FIG. 1.

DETAILED DESCRIPTION

Figure 1:
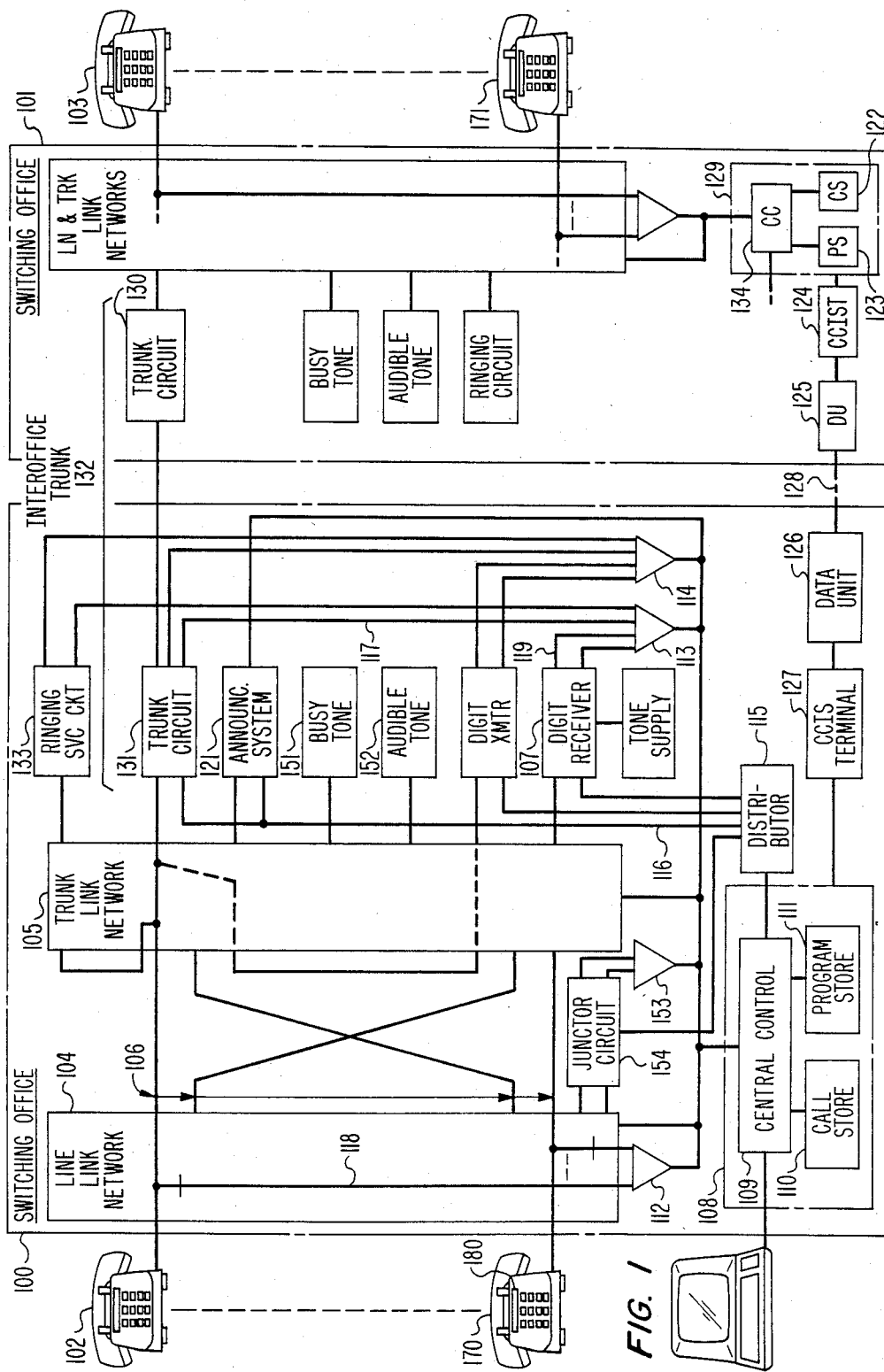
FIG. 1 shows, in block diagram form, a typical telephone switching network having two stored program-controlled switching systems interconnected by trunks and an interoffice signaling system.

FIG. 1 shows a block diagram of a typical switching network comprising telephone switching offices 100 and 101 which serve a plurality of customer stations such as 102, 103, 170 and 171.

By way of example, each of the telephone switching offices is suitably an electronic program-controlled switching system of the type disclosed in U.S. Pat. No. 3,570,008 to R. W. Downing et al. of Mar. 9, 1971, and also disclosed in *The Bell System Technical Journal*, Vol. 43, No. 5, Parts 1 and 2, September, 1964. These citations may be referred to for a more comprehensive understanding of the construction and operation of the switching system, but a brief description will be given herein to illustrate how the invention functions within a switching system.

Switching office 100 comprises line link network 104, trunk link network 105, and a stored program-controlled processor 108. Line link network 104 provides the terminations for customer stations, such as 102 and 170, while trunk link network 105 provides the terminations for trunks such as interoffice trunk 132 which is terminated at switching office 100 via trunk circuit 131. The trunk link network also provides terminations for miscellaneous other circuits such as digit receiver 107, announcement system 121, etc. The line and trunk link networks are connected via wire junctors 106 to permit the interconnection of lines, trunks, and service circuits for call processing under the control of processor 108. Line link network 104 is also interconnected by junctor circuits such as 154 to complete and supervise intraoffice calls between stations such as 102 and 170.

The majority or the logic, control, storage, supervisory, and translation functions required for the operation of this system are performed by central processor 108. A typical central processor suitable for use in the illustrative switching system is described in *The Bell System Technical Journal*, Vol. 56, No. 2, February 1977. Processor 108 is a data processing facility and can be functionally divided into central control 109, call store 110, and program store 111 plus maintenance apparatus which has not been shown to simplify the drawing. Call store 110 is a memory for storing translation and routing information in addition to temporary information relating to calls in progress and special services. As will be described in more detail hereinafter, this temporary information includes the busy/idle status of circuits and stations, calling/called station directory numbers, special services information, etc.

In accordance with this invention, call store 110 also includes memory dedicated to each customer station for storing on a per call basis information which is related to another station to provide a selected special service. This information includes the identity of the other station and may also include time of day, messages, etc. The dedicated memory also includes a service indicator to designate the memory for at least one selected special service. Furthermore, the indicator may also be used to designate the stored information as that of either a "calling" or a "called" station. For example, responsive to an incoming call to particular station 102, a service indicator bit for called station 102 is set to "calling" such that message waiting or return call service may be subsequently initiated. Similarly, for calls originated by the particular station, the service indicator bit is set to "called" such that automatic recall or callback service may be initiated. The service indicator may also be extended to include various combinations of factors such as, for example, type of party (calling/called), group (PBX/Centrex), or equipment; status of party, group, or equipment; screening treatment; etc. Thus, a large selection of services and subservices may be offered at a particular station. However, for the purposes of this illustrative embodiment, call store memory is dedicated to each customer station for storing on a per call basis, the directory number of the other station. Furthermore, the dedicated memory is designated for a selected special service by a "calling/called" service indicator bit.

Program store 111 is a memory for storing the program instructions which direct the central control to sequentially perform its many functions.

Central control 109 is the information processing unit of the system and executes the program instructions listed in program store 111 using information temporarily stored in call store 110.

Processor 108 interfaces with lines, trunks, and service circuits via scanners 112-114 and 153 and distributor 115. Distributor 115 responds to an order over a bus system from the central control to apply pulses to distribution points connected to peripheral units of equipment. For example, in response to an appropriate order, distributor 115 signals over conductor 116 to actuate apparatus such as a relay in trunk circuit 131.

Scanners 112-114 and 153 are used to gather information for the central control by monitoring leads connected to the various peripheral units and customer stations. Thus, when a trunk circuit such as 131 changes state as a result of a seizure from a distant originating switching office, a signal is transmitted via conductor 117 to scanner 113. Similarly, scanner 113 recognizes changes of state in digit receiver 107 via conductor 119 in order to ascertain digits received from lines or trunks. Likewise, scanners 112 and 153 are used to recognize the busy/idle (off-hook/on-hook) condition of customer stations such as 102 and 170. Periodically, the scanners are addressed by central control 109 over a bus system to determine the state of the peripheral units and customer stations.

Switching office 101 basically comprises the same units of equipment as switching office 100 and need not be described herein.

Switching offices 100 and 101 are connected together and to other switching offices via a common channel interoffice signaling (CCIS) system comprising terminals 124 and 127, data units 125 and 126, and data link 128. The signaling system provides high speed data transmission facilities between the central processors of offices 100 and 101 to carry all signaling, address, and network control information independently of the interoffice talking paths. For instance, this information includes the identity of trunks used by the customers as well as calling and called party identification.

A typical example of a common channel interoffice signaling system which can be used in the present embodiment is disclosed in *The Bell System Technical Journal* Vol. 57, No. 2, February, 1978.

To illustrate the operation of this novel arrangement for providing a plurality of special services, let it be assumed that the customers at stations 102 and 170 in FIG. 1 have been provided with this feature. The ensuing description wherein each customer is provided with a plurality of special services will be made with reference to the block diagram of FIG. 1 and the flow diagram of FIGS. 2-14.

While this arrangement may be used to provide a customer with any number of special services either singly or in combination, only a few services are considered herein for illustrative purposes. For example, one of these services may include automatic recall wherein a customer may use an abbreviated dialed code to attempt call completion to the previously dialed directory number. Another special service may include automatic callback wherein the status of the particular station requesting the service and the specific called station is monitored until both are idle at which time a call is attempted between the particular station and the specific called station.

The method for providing a plurality of services with this novel arrangement may be divided into three phases: storage, activation, and delayed completion. One way to implement the storage phase is when a call is originated at a particular customer station. The dialed directory number of the specific called station is stored in a table entry which is dedicated to the particular station and referred to as the "line history word" (LHW). Another way to implement the storage phase is when another station calls the particular station. Here, the directory number of the other station is stored in the same table entry dedicated to the particular station. Along with each stored directory number, a service indicator bit, which is contained in the table entry, is set to designate the table entry for at least one selected special service. The stored directory number along with the service indicator bit are then used for providing the selected special service such as calling the specific "calling/called" station in the activation phase.

The activation phase is implemented when a predetermined access code is entered at the particular customer station. Responsive to this access code, the stored directory number is used to activate the designated special service. For example, in the case where the table entry contains a single memory location, the directory number which was last entered in the table entry is used to activate the designated special service. In the case where the table entry is large enough to store multiple directory numbers and associated indicator bits, one of the designated special services is first chosen per a predetermined algorithm such as the order in real time in which the directory numbers were entered in the table. Different access codes may also be used to individually choose a special service. When the special service is chosen, the stored directory number which is associated with the chosen service, is used to activate the service. During activation, if the station having the stored directory number is in an idle condition or has been provided with well-known call waiting service, the call proceeds in a normal manner. However, if the station is busy, the customer receives a confirmation tone at which time the delayed completion phase is implemented.

In the delayed completion phase, the busy/idle condition of the particular customer station and the specific station, which has the stored directory number associated with chosen service, are both monitored. When both are idle, the particular station is rung back in a distinctive manner, and upon the customer answering, the call to the specific station is completed. The delayed completion phase is maintained until the particular customer answers or until some predetermined time interval such as, for example, 30 minutes has elapsed.

Figure 2:
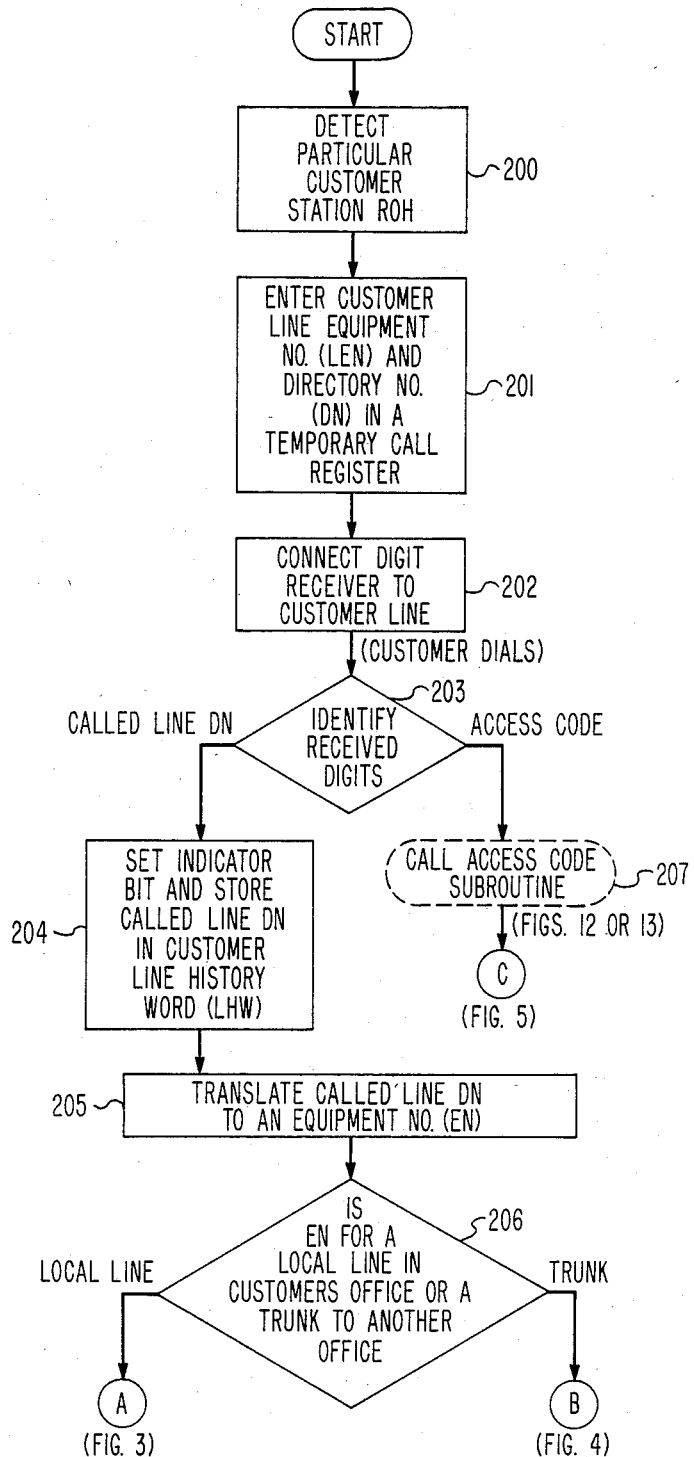
Figure 6:
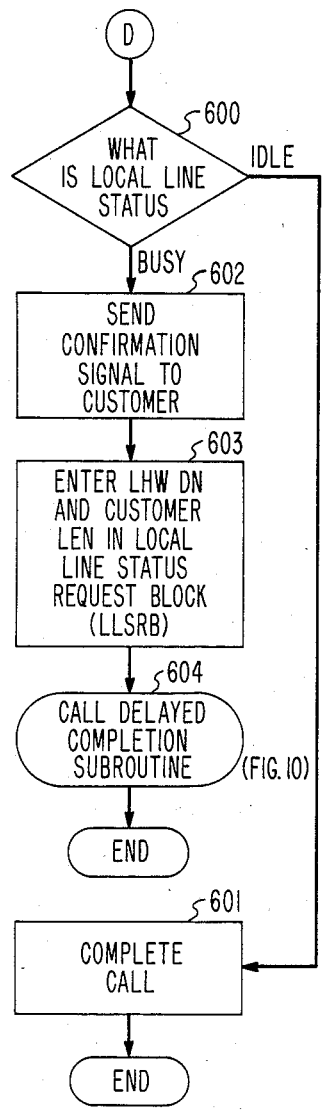
Figure 7:
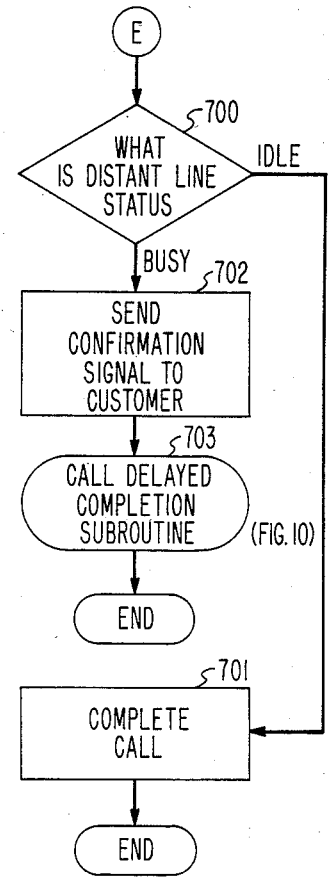

As previously suggested, the storage phase of the arrangement may be implemented in one of two manners. First, the customer at station 102 may lift his/her receiver to place a regular telephone call. As shown in FIG. 2 of the flow diagram, scanner 112 recognizes the receiver off hook (ROH) and transmits this information to central control 109 which determines that this is a new request for service (block 200). Central control 109 then enters the line equipment number (LEN) and directory number (DN) of the particular customer station into a temporary call register (block 201).

Figure 15:
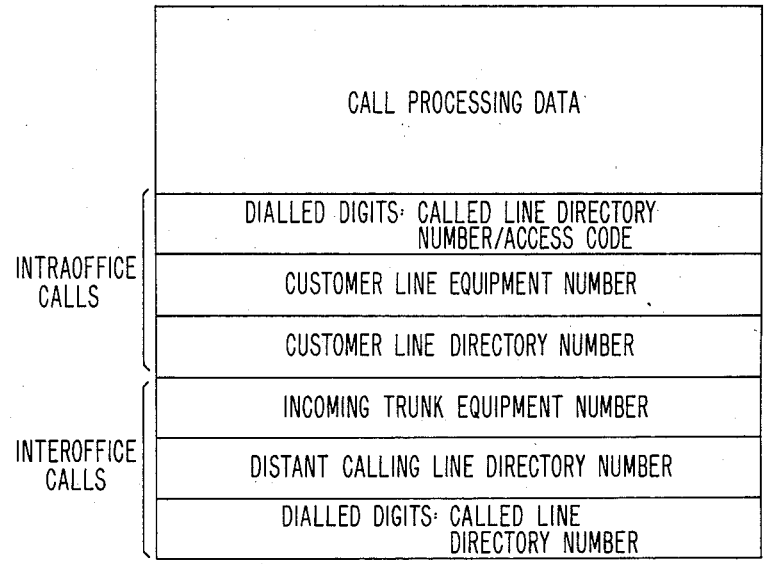
FIG. 15 shows the memory layout of a temporary call register in the call store of a telephone switching system in FIG. 1.

Shown in FIG. 15 is the layout of a temporary call register in call store 110. This register is used by the central control to temporarily store call processing information. This information includes well-known general call processing data as well as specific data for intraoffice and interoffice calls. For intraoffice calls, this specific data includes the dialed digits and the equipment and directory numbers of the particular calling customer line. For interoffice calls, this specific data includes the equipment number of the incoming trunk as well as the dialed digits. As interoffice call completion progresses, the distant calling line directory number is also included.

Returning to FIG. 2, it can be seen that digit receiver 107 is then connected to station 102 via one of the junctors 106 (block 202). Dial tone is returned to the station, and the customer thereat dials or keys an access code or the directory number of a called station. Central control 109 reads the dialed digits received by digit receiver 107 via scanner 113 and stores them in the temporary call register. Under the control of a digit analysis program and through the use of translation tables in call store 110, central control 109 determines the disposition of the call. When the received digits correspond to an access code (block 203), central control 109 implements the activation phase. However, recognizing that the dialed digits correspond to the directory number of a called line (block 203), central control 109 stores the called line directory number in the line history word of the particular station and sets the service indicator bit to "called" (block 204).

The specific called line directory number is then translated by central control 109 to an equipment number (EN) (block 205). This equipment number will correspond either to a local line in originating switching office 100 or to an interoffice trunk such as 132 to terminating switching office 101 (block 206).

As depicted in the line history word memory data structure of FIG. 17, the line history word table is accessed using the line equipment number of the particular station which is stored in the temporary call register. A portion of the line equipment number is used to select the memory address of the particular line history word table in the LHW head table. With the beginning address of the selected line history word table, the remaining portion of the line equipment number is used to index the entry of the table associated with the particular customer station.

The layout of a single memory location line history word is depicted in FIG. 18. As shown, the single location entry includes control and directory number fields. The control field includes the service indicator bit which designates the table entry for a selected special service. Also included in the control field is a privacy bit to prevent disclosure of certain station directory numbers. Although shown as only a single location entry, the line history table entry for each associated customer in a switching office may include additional locations fashioned, for example, in a well-known, push-down stack arrangement. These additional locations may be used for storing messages including time of call information. Similarly, each table entry may include two push-down stacks for separately storing called and calling station directory numbers. These multiple memory location table entries may be used with multiple access codes to enhance the novel arrangement which will be described hereinafter. These calling and called directory numbers associated with each customer station are then utilized when in the activation phase of the novel arrangement.

When the equipment number corresponds to a local line such as that of called station 170, central control 109 determines the busy/idle status of called station 170 via scanner 112 as depicted in decision block 300 of FIG. 3. When called station 170 is in a busy condition, busy tone circuit 151 sends a busy signal to particular calling station 102 (block 301). Recognizing that called station 170 is in an idle condition, central control 109 stores the directory number of particular calling station 102 in the line history table entry associated with called station 170 and sets the service indicator bit to "calling" (block 302). The call then proceeds in a normal manner. Audible tone circuit 152 sends an audible ringing signal to particular station 102, and ringing service circuit 133 rings called station 170 (block 303).

When called station 170 has been provided with well-known call waiting service and is in a busy condition, the call is handled as if the called line were in an idle condition. Appropriately, audible ringing tone is sent to the customer station 102, and a call waiting tone is sent to the busy called station 170. As an option, the directory number of calling station 102 may be displayed at display 180 of called station 170 (phantom block 304) which may be any well-known and commercially available LED or the like display station set.

A display arrangement suitable for use with illustrative switching office 100 is described in the copending application of C. A. Doughty, entitled "Method and Apparatus for Displaying at a Selected Station Special Service Information during a Silent Interval between Ringing".

When the called line directory number translates to an equipment number for an outgoing trunk to another switching office, a trunk connection is estabished to terminating switching office (TSO) 101 via the CCIS system as shown in block 401 of FIG. 4. This is accomplished by sending a well-known CCIS initial address message to terminating switching office 101, which includes the trunk identification and dialed digits. This information is sent from originating switching office 100 to processor 129 in terminating switching office 101 via CCIS terminal 127, data unit 126, data link 128, data unit 125, and CCIS terminal 124. Receiving the called line directory number, processor 129 translates the directory number into the line equipment number of the called line. From here, the call is handled in a normal manner.

At terminating switching office 101, central control 134 determines the busy/idle status of specific called station 103 (block 405). When the distant called line is in a busy condition, a busy signal is sent to particular calling station 102 (block 406). However, when called station 103 is in an idle condition or has been provided with call waiting service, the call is then completed in a normal manner with terminating switching office 101 ringing specific called station 103 (block 407). In addition, audible ringing is returned to particular calling station 102.

Another way to implement the storage phase is depicted in FIG. 8 when particular station 102 receives an incoming interoffice call. Here, switching office 100, now a terminating office, receives a CCIS initial address message identifying the interoffice trunk and the directory number of the called customer station (block 800). For this illustrative embodiment, let it be assumed that specific calling station 103 at originating switching office 101 wishes to call particular station 102, now a called station, at terminating switching office 100. The call is processed by originating switching office 101 in the usual manner by sending a well-known CCIS banded-type signaling service request message to terminating switching office 100. From this CCIS request message, processor 108 enters the particular called line directory number in a temporary call register (block 801). Processor 108 then translates the particular called line directory number to a line equipment number for the called station. While completing the call in the normal fashion, central control 109 also composes a CCIS message requesting the directory number of the specific calling station from the originating switching office (block 802). Alternatively, the calling station directory number may be included in the initial CCIS request message.

At originating switching office 101, the CCIS request message is processed to ascertain the directory number of specific calling station 103. The directory number along with interoffice trunk number 132 is transmitted via the CCIS system to terminating switching office 100. Receiving the calling line directory number (block 803), central control 109 enters the specific calling line directory number in the temporary call register associated with the call (block 804). During normal call processing, central control 109 determines the busy/idle status of the local called station as depicted in decision block 300 of FIG. 3. When the particular called station is in a busy state, an audible busy signal is sent to calling station 103 (block 301). When called station 102 is in an idle condition or has been provided with call waiting service, central control 109 stores the directory number of the specific calling station in the temporary call register into the line history word associated with the particular called line and sets the service indicator bit to "calling" (block 302). Ringing service circuit 133 provides ringing current to particular called station 102 (block 303), and audible tone circuit 152 sends an audible ringing signal to specific calling station 103. As previously suggested, the directory number of specific calling station 103 may also be indicated at particular station 102 by the use of an LED or the like station set.

Thus, when a call is placed from a particular calling station to a specific called station in the same or another office, the called station directory number is stored in the line history word associated with the particular station. In addition, the associated service indicator bit is set to "called" to designate the table entry for a selected "called" special service. Likewise, when a call is placed to the same particular customer station from a calling station in the same or another switching office, the specific calling station directory number is entered in the same line history word. Similarly, the service indicator bit is set to "calling" to designate the line history table entry for a selected "calling" special service. As previously mentioned, the table entry for a particular station may comprise a single memory location or any number of memory locations each having a service indicator bit for designating the table entry for a selected service and additional bits for storing calling-/called directory numbers.

The activation phase of the novel arrangement is implemented when a customer desires to implement one of the available special services such as automatic recall, automatic callback, etc. Common to all of these services in this illustrative embodiment is the ability of the customer to place a call to a specific station identified by the directory number stored in the line history table entry associated with the particular station. As with the storage phase indicated in blocks 200 through 203 of FIG. 2, the customer at particular station 102 implements the activation phase by lifting his receiver as though placing a regular telephone call and keying in an access code.

This access code may be a special 2 or 3 digit number and, in order to distinguish it from other codes, could include the star (*) or pound (#) found on a telephone key set. A single code may be provided to retrieve specific calling and called directory numbers per a predetermined algorithm such as, for example, the order in real time in which the directory numbers were entered into the line history table entry associated with the particular station. Separate codes may also be used to choose individual special services. One code may be used to retrieve calling station directory numbers; the other, to retrieve called station directory numbers.

As shown in operation blocks 200 through 202 of FIG. 2, scanner 112 recognizes the receiver off hook (ROH) and sends this information to central control 109 which enters the line equipment and directory numbers of station 102 in a temporary call register of call store 110. Central control 109 then connects digit receiver 107 to the customer station, and the customer thereat keys the special access code indicating the desire to utilize one of the special services (phantom call block 207). Let it be assumed that the line history table entry associated with the particular station comprises a single memory location for storing called and calling line directory numbers. A multiple memory location table entry arrangement will be described hereinafter.

The illustrated single memory location table entry arrangement requires only one access code. Upon identifying this access code (block 203), central control 109 retrieves the directory number stored in the line history table entry associated with the particular station as depicted in block 500 of FIG. 5. The line history word directory number is entered in the temporary call register associated with the call (block 501) and translated to an equipment number (block 502).

When the translated equipment number corresponds to a local line in the customer's office such as that of station 170 (block 503), central control 109 determines the busy/idle condition of the specific local line (block 504). When the local called line is in an idle state or has call waiting service as depicted in block 600 of FIG. 6, the call is completed in a normal manner (block 601), whereby particular station 102 and local station 170 are interconnected. However, recognizing that the local line is in a busy state, central control 109 causes a delayed completion confirmation signal to be sent to customer station 102 (block 602). In addition, central control 109 selects a local line status request block (LLSRB) in call store 110 and enters the line history word directory number of the local called station and the line equipment number of the particular station (block 603). The delayed completion subroutine (FIG. 10) is then called to implement the delayed completion phase of the novel arrangement (block 604).

Returning to decision block 503 of FIG. 5, when the line history word directory number associated with the particular station translates to an equipment number for an outgoing trunk to another office, it can be seen that the line history word directory number and the particular station line equipment number are entered in a distant line status request block (block 505). After entering call processing information in the distant line status request block, the distant line status subroutine (FIG. 9) is called (block 506).

Figure 16:
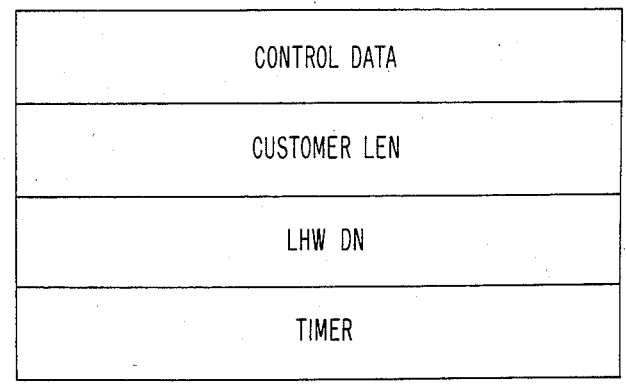
FIG. 16 shows the memory layout of an individual line status request block in the call store of FIG. 1.

Depicted in FIG. 16 is the memory layout of an individual line status request block. Distant and local line status request blocks are located in call store 110 and store the particular station LEN, line history word directory number, and control data such as the temporary call register address, call processing program return address, etc. Also included in the request blocks is a timer count for the delayed completion phase. The CCIS system uses the information in a distant line status request block to obtain the status of the specific distant line. CCIS request and response messages use the index into a distant line status request block table to identify a particular distant line status request block.

Shown in FIG. 9 is the distant line status subroutine which is used to exchange CCIS direct signaling distant line status request and response messages between switching offices 100 and 101. Originating switching office 100 sends a CCIS distant line status request message to terminating switching office 101 for the specific distant station identified by the line history word directory number entered in the distant line status request block (block 900). In response to the CCIS request message, terminating switching office 100 determines the busy/idle status of the specific distant line (block 901) and returns a CCIS distant line status response message to originating switching office 100 (block 902). Receiving this response message, originating switching office 100 associates the distant line status with the distant line status request block identified by the CCIS response message (block 903).

Returning to FIG. 7, when the distant line is in an idle state, it can be seen that the interoffice call between particular customer station 102 and specific distant line station 103 is completed in a normal manner using the CCIS system as previously described (blocks 700 and 701). However, when central control 109 recognizes that the distant line is in a busy state, a delayed completion confirmation signal is sent to customer station 102 (block 702), and the delayed completion subroutine (FIG. 10) is called to implement the delayed completion phase of the arrangement (block 703).

The delayed completion phase of the novel arrangement is implemented when a particular customer has attempted to complete a call to a specific station in a busy condition, this station being identified by the directory number in the line history table entry associated with the particular station. In the delayed completion phase, a call between the particular station and the identified specific station is attempted until the call can be completed or until a predetermined time period has elapsed such as, for example, 30 minutes. Alternatively, the customer may enter a code to cancel the delayed completion feature.

Depicted in FIGS. 10 and 11 is the delayed completion subroutine. As indicated in block 1000 of FIG. 10, central control 109 initializes a timer in the line status request block associated with the call for a predetermined time period such as, for example, 30 minutes. The request block timer count is then periodically checked at a predetermined rate such as, for example, every 40 seconds (block 1001). When the request block timer count exceeds the predetermined time period, the request block is released terminating the delayed completion portion of the arrangement (blocks 1002 and 1003). Recognizing that the time period has not elapsed, central control 109 determines the status of the desired specific line identified by the line history word directory number which was entered in either the local or distant line status request block (blocks 1004 through 1006). As long as the desired specific line remains busy, central control 109 continues to periodically check the request block timer count and the desired line status until either a time out occurs (block 1002) or the desired line assumes an idle condition (block 1007). Alternatively, the terminating switching office may monitor the desired specific line and send a distant line status message when the desired specific line is idle.

Recognizing that the desired line is in an idle condition, central control 109 determines the busy/idle status of the particular customer line identified by the line equipment number which was entered in the line status request block (block 1008). When the customer's line is in a busy condition, periodic examination of the request block timer count and status of the desired line is continued as previously described (block 1100 of FIG. 11). However, when the particular customer's line is in an idle condition, ringing service circuit 133 rings back customer station 102 in a distinctive manner (blocks 1100 and 1101). Since the delayed completion of a call to more than one specific calling station may have been initiated at particular station 102, the line history word directory number and designated special service may be displayed at particular station 102 by providing the customer with any one of a number of well-known and commercially available LED or the like display station sets (block 1102). When the customer at station 102 does not respond to the distinctive ring back signal by answering the phone (block 1103), the rate at which the request block timer count (block 1104) and the busy/idle condition of the customer station are examined is reduced until either a time out occurs or the customer answers the ring back.

When the customer at station 102 answers, central control 109 enters the customer station's line equipment number and the line history word directory number in the request block in a temporary call register (block 1105). The request block is then released, and the call is completed to the specific station identified by the line history word directory number (block 1106). Alternatively, the line history word directory number and designated special service may be announced at station 102 in the form of a message from announcement system 121. After having identified the stored directory number, the customer may wish to cancel the call attempt or complete the call. In either case, the line status request block is released. Again, alternatively, the delayed completion feature may periodically ring the line having the line history word directory number until answered, at which time the particular station is rung back.

As previously mentioned, multiple memory locations for the table entry associated with a particular customer may be provided to store a number of calling and called directory numbers in a push-down stack arrangement. In such case, a single access code subroutine as shown in FIG. 12 may be utilized to choose a selected special service based on the service indicator and then display the chosen special service and directory number before the service is activated. After identifying the received digits from the customer as an access code (decision block 203 in FIG. 2), the single access code subroutine is called (phantom call block 207). As indicated in blocks 1200 and 1201 of FIG. 12, central control 109 retrieves the directory number from the top of the line history word stack and indicates the line history word directory number along with the service to the customer. As previously mentioned, the service indicator designates the memory location for a selected special service. Again, the chosen service and related station information may be indicated to the customer in the form of a message from the announcement system or by a display located at the customer station. At this point, the customer may wish to hang up, learn of any more calling/called directory numbers, or place a call to the indicated directory number (blocks 1202–1206). Desiring to call the indicated directory number, the customer enters an appropriate code or waits an appropriate time period after which the call is attempted as previously described in the activation and delayed completion phases of the arrangement. Desiring the next called/calling directory number stored in the line history word stack, the customer enters another code. When additional entries are available, central control 109 retrieves the next directory number and designated special service indicator stored in the line history word stack and so indicates to the customer (blocks 1205 and 1201). When additional entries cannot be found, an announcement may be played or a message displayed to the customer (block 1206).

Depicted in FIGS. 13 and 14 is a multiple access code subroutine similar to the single access code subroutine. Thus, one code may be used for choosing a first selected special service to connect to calling line directory numbers, and another code may be used for choosing a second selected special service to summon called line directory numbers. When this multiple access code subroutine is entered, central control 109 determines the desired special service by the type of access code entered by the customer (block 1300) and then retrieves the called/calling directory number from the top of the line history word stack (block 1301 of FIG. 13/block 1401 of FIG. 14). Assuming that an access code for a "called" service was entered and that the retrieved directory number has a "called" service indicator (block 1302), the line history word directory number will be identified to the customer as was previously described with the single access code subroutine (blocks 1303–1305). When the service indicator is not "called", central control retrieves the next entry in the line history word stack when additional entries are available (blocks 1306 and 1307) or gives an end of list indication to the customer (block 1308). Likewise, a similar routine as depicted in FIG. 14 is utilized when a "calling" service is desired.

It is to be understood that the above-described method and apparatus is merely an illustrative embodiment of the principles of this invention and that numerous other methods and arrangements may be devised by those skilled in the art without departing from the spirit and scope of the invention. In particular, the multiple access code subroutine may also be implemented to first choose a group of selected special services for a specific calling/called station, display the special services, and then activate one or more of the services in response to a predetermined code. The activation of the services may also be dependent on the busy/idle status of the specific station or to screening information entered at the specific station. For example, a don't disturb feature may be initiated by a called customer in which the calling customer is routed to a don't disturb announcement. The calling station directory number would then be entered in the called station's line history table entry for subsequent callback. Thus, a large number of special services for a specific station may be chosen at a particular station using a combination of access codes, station conditions, and screening information.

What is claimed is:

1. For use with a telephone system serving a plurality of stations, a method for providing a plurality of special services; comprising the steps of:
   responsive to a call between a particular one and a specific one of said stations, designating a memory dedicated to said particular station for at least a selected one of said special services; and
   storing in said designated memory information related to said specific station for providing said selected service.

2. The method set forth in claim 1 wherein said information comprises the identity of said specific station and wherein said method further comprises the step of indicating at said particular station the identity of said specific station.

3. The method set forth in claim 2 wherein said method further comprises indicating at said particular station said selected service.

4. The method set forth in claim 1 wherein said method further comprises the step of activating said selected service in response to a predetermined code entered at said particular station.

5. The method set forth in claim 4 wherein said step of activating said selected service comprises the steps of:
   monitoring the busy/idle condition of said specific station;
   sending a delayed completion confirmation signal to said particular station when said specific station is in a busy condition; and
   signaling said specific station when said specific station is in an idle condition.

6. The method set forth in claim 4 wherein said method further comprises the step of delaying the completion of said selected service responsive to the busy condition of said specific station.

7. The method set forth in claim 6 wherein said step of activating said selected service comprises the steps of:
   monitoring the busy/idle condition of said specific station;
   sending a delayed completion confirmation signal to said particular station when said specific station is in a busy condition; and
   signaling said specific station when said specific station is in an idle condition.

8. The method set forth in claim 7 wherein said step of delaying the completion of said selected service comprises the steps of:
   monitoring the busy/idle condition of said particular station;
   signaling said particular station in a distinctive manner when said particular and specific stations are both in an idle condition; and
   signaling said specific station when said particular station responds to said distinctive signaling.

9. The method set forth in claim 8 wherein said information comprises the identity of said specific station and wherein said step of delaying the completion of said selected service further comprises the step of indicating at said particular station the identity of said specific station.

10. The method set forth in claim 8 wherein said step of delaying the completion of said selected service further comprises the step of repeating at a predetermined rate said step of signaling said particular station in a distinctive manner.

11. The method set forth in claim 10 wherein said step of delaying the completion of said selected service further comprises the step of terminating the execution of said selected service when a predetermined period of time has elapsed.

12. For use in a telephone system serving a plurality of stations, apparatus for providing a plurality of special services; comprising:
   means responsive to a call between a particular one and a specific one of said stations for designating a memory dedicated to said particular station for at least a selected one of said special services; and
   means for storing in said memory designated for said selected service information related to said specific station for providing said selected service.

13. The apparatus set forth in claim 12 wherein said information comprises the identity of said specific station and wherein said apparatus further comprises means for indicating at said particular station the identity of said specific station.

14. For use with a telephone system serving a plurality of stations, a method for providing a plurality of special services; comprising the steps of:
   responsive to a call between a particular one and a first specific one of said stations, designating a memory associated with said particular station for at least a first selected one of said special services;
   storing in said memory designated for said first selected service information related to said first specific station for providing said first selected service;
   responsive to a call between said particular station and a second specific one of said stations, designating a memory associated with said particular station for at least a second selected one of said special services; and
   storing in said memory designated for said second selected service information related to said second specific station for providing said second selected service.

15. The method set forth in claim 14 wherein said method further comprises the step of choosing one of said first and second selected services for activation in response to a respective one of first and second predetermined codes entered at said particular station.

16. The method set forth in claim 15 wherein said method further comprises the step of indicating at said particular station the information stored in said memory designated for said chosen service.

17. The method set forth in claim 14 wherein said method further comprises the step of choosing per a predetermined algorithm one of said first and second selected services for activation in response to a predetermined code entered at said particular station.

18. The method set forth in claim 17 wherein said method further comprises the step of indicating at said particular station said chosen service and the information stored in the memory designated for said chosen service.

19. The method set forth in claim 17 wherein said predetermined algorithm is based on the order in real time in which said memories were designated for said first and second selected services.

20. The method set forth in claim 17 wherein said method further comprises the step of activating said chosen service.

21. The method set forth in claim 20 wherein said step of activating said chosen service comprises the steps of:
monitoring the busy/idle condition of the specific station related to the information stored in said memory designated for said chosen service;
sending a delayed completion confirmation signal to said particular station when the related specific station is in a busy condition; and
signaling the related specific station when the related specific station is in an idle condition.

22. The method set forth in claim 20 wherein said method further comprises the step of delaying the completion of said chosen service responsive to the busy/idle condition of the specific station related to the information stored in said memory designated for said chosen service.

23. The method set forth in claim 22 wherein said step of activating said chosen service comprises the steps of:
monitoring the busy/idle condition of the specific station related to the information stored in said memory designated for said chosen service;
sending a delayed completion confirmation signal to said particular station when the related specific station is in a busy condition; and
signaling the related specific station when the related specific station is in an idle condition.

24. The method set forth in claim 23 wherein step of delaying the completion of said chosen service comprises the steps of:
monitoring the busy/idle condition of said particular station;
signaling said particular station in a distinctive manner when said particular station and the related specific station are both in an idle condition; and
signaling the related specific station when said particular station responds to said distinctive signaling.

25. The method set forth in claim 24 wherein said step of delaying the completion of said chosen service further comprises the step of indicating at said particular station said chosen service and the information stored in the memory designated for said chosen service.

26. The method set forth in claim 24 wherein said step of delaying the completion of said chosen service further comprises the step of repeating at a predetermined rate said step of signaling said particular station in a distinctive manner.

27. The method set forth in claim 26 wherein said step of delaying the completion of said chosen service further comprises the step of terminating the execution of said chosen service when a predetermined period of time has elapsed.

28. For use in a telephone system serving a plurality of stations, apparatus for providing a plurality of special services; comprising:
means responsive to a call between a particular one and a first specific one of said stations for designating a memory associated with said particular station for at least a first selected one of said special services;
means for storing in said memory designated for said first selected service information related to said first specific station for providing said first selected service;
means responsive to a call between said particular station and a second specific one of said stations for designating a memory associated with said particular station for at least a second selected one of said special services; and
means for storing in said memory designated for said second selected service information related to said second specific station for providing said second selected service.

29. The apparatus set forth in claim 28 wherein said apparatus further comprises means for choosing one of said first and second selected services for activation in response to a respective one of first and second predetermined codes entered at said particular station.

30. The apparatus set forth in claim 28 wherein said apparatus further comprises means for choosing per a predetermined algorithm one of said first and second selected services for activation in response to a predetermined code entered at said particular station.

31. The apparatus set forth in claim 30 wherein said apparatus further comprises means for activating said chosen service.

32. The apparatus set forth in claim 31 wherein said means for activating said chosen service comprises:
means for monitoring the busy/idle condition of the specific station related to the information stored in said memory designated for said chosen service;
means for sending a delayed completion confirmation signal to said particular station when the related specific station is in a busy condition; and
means for signaling the related specific station when the related specific station is in an idle condition.

33. The apparatus set forth in claim 31 wherein said apparatus further comprises means responsive to the busy condition of the related specific station for delaying the completion of said chosen service.

34. The apparatus set forth in claim 33 wherein said means for activating said chosen service comprises:
means for monitoring the busy/idle condition of the specific station related to the information stored in said memory designated for said chosen service;
means for sending a delayed completion confirmation signal to said particular station when the related specific station is in a busy condition; and
means for signaling the related specific station when the related specific station is in an idle condition.

35. The apparatus set forth in claim 34 wherein said means for delaying the completion of said chosen service comprises:
   means for monitoring the busy/idle condition of said particular station;
   means for signaling said particular station in a distinctive manner when said particular station and the related specific station are both in an idle condition; and
   means for signaling the related specific station when said particular station responds to said distinctive signaling.

36. The apparatus set forth in claim 35 wherein said means for delaying the completion of said chosen service further comprises means for indicating at said particular station said chosen service and the information stored in said memory designated for said chosen service.

37. The apparatus set forth in claim 35 wherein said means for delaying the completion of said chosen service further comprises means for periodically signaling at a predetermined rate said particular station in a distinctive manner.

38. The apparatus set forth in claim 37 wherein said means for delaying the completion of said chosen service further comprises means for terminating the execution of said chosen service when a predetermined period of time has elapsed.

39. For use with a telephone system serving a plurality of stations, a method for providing a plurality of special services, comprising the steps of:
   responsive to a call from a specific calling one of said stations to a particular one of said stations, storing the identity of said calling station in a memory associated with said particular station;
   responsive to a call from said particular station to a specific called one of said stations, storing in said memory the identity of said called station; and
   responsive to a predetermined code from said particular station, choosing from said memory the identity of one of said specific calling and called stations per a predetermined algorithm for placing a subsequent call from said particular station to the specific station having the chosen identity.

40. The method set forth in claim 39 wherein said method further comprises the step of indicating at said particular station the chosen identity of one of said specific calling and called stations.

41. The method set forth in claim 39 wherein said method further comprises the steps of:
   monitoring the busy/idle condition of the specific station having the chosen identity;
   sending a delayed completion confirmation signal to said particular station when the specific station having the chosen identity is in a busy condition; and
   signaling the specific station having the chosen identity when the specific station having the chosen identity is in an idle condition.

42. The method set forth in claim 41 wherein said method further comprises the steps of:
   monitoring the busy/idle condition of said particular station;
   signaling said particular station in a distinctive manner when said particular station and the specific station having the chosen identity are both in an idle condition; and
   signaling the specific station having the chosen identity when said particular station responds to said distinctive signaling.

43. The method set forth in claim 42 wherein said method further comprises the step of repeating at a predetermined rate said step of signaling said particular station in a distinctive manner.

44. The method set forth in claim 43 wherein said method further comprises the step of terminating said distinctive signaling when a predetermined period of time has elapsed.

45. The method set forth in claim 43 wherein said method further comprises the step of indicating at said particular station the chosen identity.

46. For use in a telephone system serving a plurality of stations, apparatus for providing a plurality of special services comprising:
   means responsive to a call from a specific calling one of said stations to a particular one of said stations for storing the identity of said calling station in a memory associated with said particular station;
   means responsive to a call from said particular station to a specific called one of said stations for storing in said memory the identity of said called station; and
   means responsive to a predetermined code from said particular station for choosing from said memory the identity of one of said specific calling and called stations per a predetermined algorithm for placing a subsequent call from said particular station to the station having said chosen identity.

47. The apparatus set forth in claim 46 wherein said apparatus further comprises means for indicating the chosen identity of one of said specific calling and called stations.

48. The apparatus set forth in claim 46 wherein said apparatus further comprises:
   means for monitoring the busy/idle condition of the specific station having the chosen identity;
   means for sending a delayed completion confirmation signal to said particular station when the specific station having the chosen identity is in a busy condition; and
   means for signaling the specific station having the chosen identity when the specific station having the chosen identity is in an idle condition.

49. The apparatus set forth in claim 48 wherein said apparatus further comprises:
   means for monitoring the busy/idle condition of said particular station;
   means for signaling said particular station in a distinctive manner when said particular station and the specific station having the chosen identity are both in an idle condition; and
   means for signaling the specific station having the chosen identity when said particular station responds to said distinctive signaling.

50. The apparatus set forth in claim 49 wherein said apparatus further comprises means for periodically signaling said particular station in said distinctive manner at a predetermined rate.

51. The apparatus set forth in claim 50 wherein said apparatus further comprises means for terminating said distinctive signaling of said particular station when a predetermined period of time has elapsed.

52. The apparatus set forth in claim 50 wherein said apparatus further comprises means for indicating at said particular station the chosen identity.

* * * * *